Patented Feb. 6, 1923.

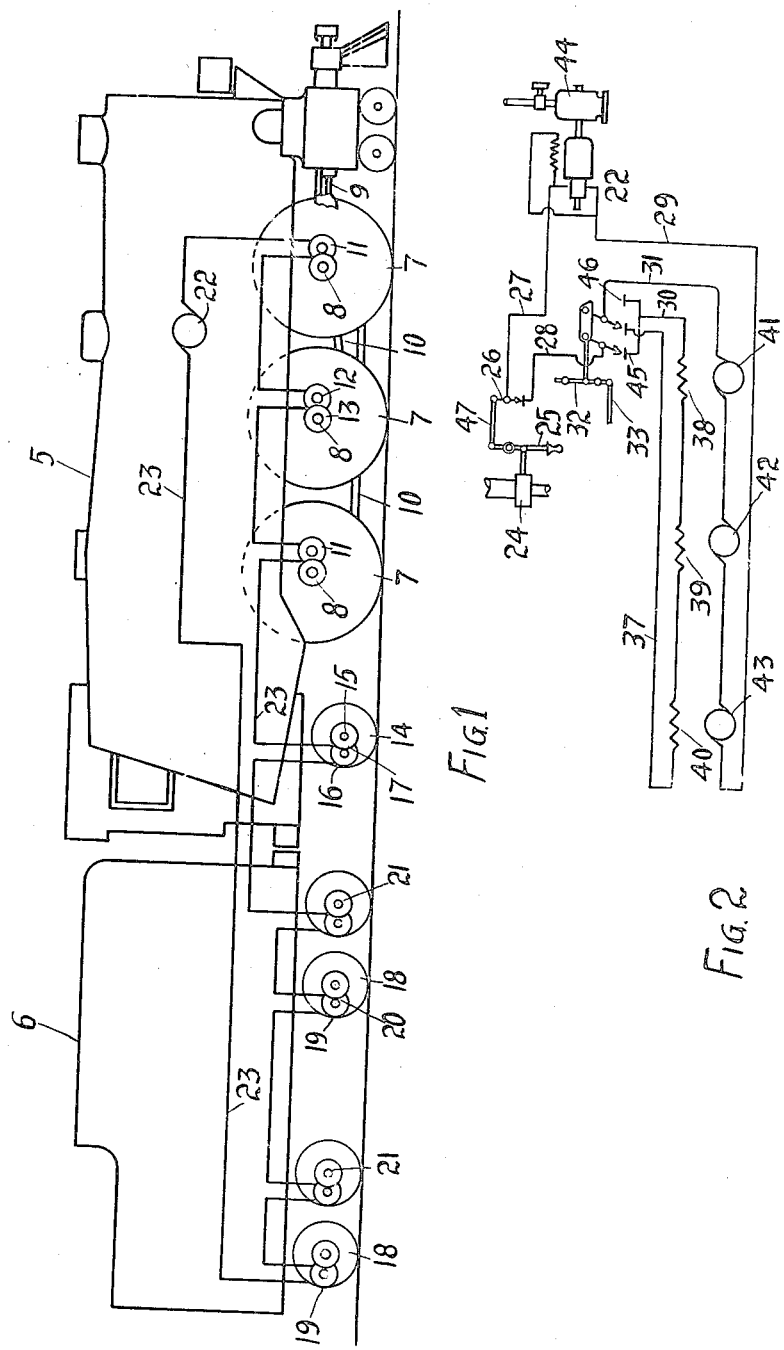

1,444,545

UNITED STATES PATENT OFFICE.

ALEXANDER T. KASLEY, OF TINICUM TOWNSHIP, DELAWARE COUNTY, PENNSYLVANIA, ASSIGNOR TO WESTINGHOUSE ELECTRIC & MANUFACTURING CO., A CORPORATION OF PENNSYLVANIA.

LOCOMOTIVE.

Application filed June 6, 1919. Serial No. 302,260.

*To all whom it may concern:*

Be it known that I, ALEXANDER T. KASLEY, a citizen of the United States, and a resident of Tinicum Township, in the county of Delaware and State of Pennsylvania, have made a new and useful Invention in Locomotives, of which the following is a specification.

This invention relates to locomotives and has for an object to produce a new and improved means for increasing the tractive effort of a locomotive without increasing its size or appreciably increasing its weight.

A further object is to produce means such that a part of the power delivered to one set of wheels of a locomotive is converted into electrical energy and delivered to motors driving other weight bearing wheels.

These and other objects which will be made apparent throughout the further description of my invention are attained by means of apparatus embodying the features herein described and illustrated in the drawings accompanying and forming a part hereof.

The tractive effort of a locomotive is limited by the power of the boiler and engine mechanism, and by the weight concentrated on the driving wheels. Most locomotives have sufficient power to slip their drive wheels, and consequently their tractive effort is limited by the weight concentrated on these wheels. The tractive effort of a locomotive is dependent upon the adhesion between the drive wheels and the rails, and is equal to the product of the weight on the drive wheels and the coefficient of friction between the wheels and the rails. If it were not for the fact that the tractive effort is limited by the adhesion, it would be desirable to increase the size of the engine cylinders so that a more economical operation would be obtained while running at shorter cut off. Obviously, if power is delivered to all of the weight bearing wheels of a locomotive a greater tractive effort may be exerted. Some locomotives are provided with an engine mechanism connected to the wheels of the tender, thereby greatly increasing the tractive effort of the locomotive; the term locomotive being understood to include the engine and the tender. While such an arrangement increases the tractive effort of the locomotive, it necessitates a flexible steam connection between the engine and the tender and also greatly increases the mechanical intricacy of the locomotive and decreases the efficiency of the locomotive as a power developing apparatus.

My invention contemplates a new and improved arrangement whereby power may be conveniently applied to the wheels of the tender or any other weight bearing wheels of the train, in addition to the main drive wheels. In carrying out my invention I preferably generate electricity by means of generators operatively connected to the main drive wheels or shafts of the locomotive, and deliver the electricity so generated to motors operatively connected to the wheels of the tender or to other weight bearing wheels of the locomotive or train. The motors and generators employed are preferably series wound and I also contemplate providing an exciter in the circuit which supplies both a field and armature current and therefore assists starting the locomotive. The exciter may be driven by a turbine or any other suitable apparatus. If the exciter supplied current to the fields only of the generator, there would be no armature current at zero speed and consequently no torque on either motor or generator and there would be no help in starting the train unless the main driving wheels should slip. It is well known, however, that at zero speed there is no counter E. M. F. in the motor, so that a very small amount of power would be required to maintain a full armature current and produce maximum torque on the motors and generators, thus eliminating the slippage except under very abnormal conditions. As the speed of the locomotive increases the counter E. M. F. of the motors would be approximately equal to the E. M. F. of the generators, so that under no conditions would the exciter have to supply more power than is necessary to supply the field and armature copper losses. It will be apparent that the generators may be so designed that they will supply the field and armature copper losses after a determined speed is attained. Under such conditions the exciter may be rendered inoperative, for example, by opening field circuit. This, of course, may be accomplished either manually or automatically.

In the drawings; Fig. 1 is a diagrammatic view of a locomotive embodying my invention.

Fig. 2 is a wiring diagram showing the connections for starting, reversing and disconnecting the motors.

In Fig. 1 of the drawings I have illustrated a locomotive comprising an engine 5 and a tender 6. As shown, the engine 5 is provided with three sets of drive wheels 7, each set being mounted on one of three drive shafts or axles 8. The drive wheels are, of course, suitably connected to the pistons of the engine by means of piston rods 9 and connecting rods 10, such construction being familiar to those skilled in the art and requires no further description.

As shown, each drive wheel shaft or axle 8 is operatively connected to an electric generator 11 by means of a pinion 12 and a gear 13, the latter being shown as mounted directly on the shaft or axle 8. As the gears 13 are larger than the pinions 12, as illustrated, it is evident that the generators will operate at higher speed than the drive wheels 7.

The rear end of the engine illustrated is supported by a pair of wheels 14 which are mounted on a shaft 15 and are adapted to be driven, as shown, by means of an electric motor 16 and suitable reduction gearing 17.

The tender of the locomotive illustrated is mounted on wheels 18 which are adapted to be driven by means of electric motors 19 and suitable reduction gearing 20. As shown, the wheels 18 are mounted on shafts or axles 21, which are operatively connected to the motors 19 by means of the reduction gearing 20.

As illustrated, the motors 16 and 19 and the generators 11 are all connected in series with each other and with an exciter 22 by means of suitable wiring 23. The exciter 22 may be located at any convenient point and may be driven in any suitable manner, for example, by means of a steam turbine.

In operation a part of the power delivered to the main drive wheels 7 by the connecting rods 10 is converted into electrical energy by the generators 11. This electrical energy is transmitted by the wiring 23 to the motors 16 and 19 by means of which it is reconverted into mechanical energy and, as such, delivered to the wheels 14 of the engine 5 and the wheels 18 of the tender 6. The wheels 14 and 18 bear a considerable part of the weight of the locomotive and consequently the application of power to them correspondingly increases the maximum tractive effort of the locomotive.

The motors and generators are preferably series wound, in which case the exciter 22 provides both an armature and a field current for starting, thereby assisting the engine mechanism in developing a large tractive effort. The exciter 22 may be driven by a turbine 44 and switches and controls may be provided, if desired, whereby the engineer may control the operation of the exciter, the generators and the motors.

In Fig. 2, I have shown a wiring diagram in which I have diagrammatically illustrated portions of the control mechanism of the locomotive. As shown, the throttle valve 24 is operated by a lever 25, which is also capable of actuating a switch 26 located in the control circuit of the motors. As indicated, this circuit includes the exciter 22, the wire 27, the switch 26, the wire 28, one terminal of a reversing switch 45, the wire 30, the fields 38, 39 and 40 of the motors and generators, the wire 37, a second terminal of the reversing switch 45, the wire 31 and the armatures 41, 42 and 43 of the motors and generators and the wire 29 back to the exciter. The exciter field is connected in shunt across the terminals of the exciter. The exciter is shown driven by turbine 44. The lever 32 and the link 33 indicate a portion of the reverse mechanism of the locomotive and, as illustrated, are operatively connected to the switch 45 in such a way that a movement of the reverse lever throws the reverse switch. The terminal 46 of the switch 45 is preferably made short so that at intermediate positions of the lever 32, the motors will not receive current. With such an arrangement, the motors and the generators are rendered inoperative while the engine cylinders are operating at low cutoffs.

During normal operation a certain percentage of the power delivered to the main drive wheels 7 is transmitted to the auxiliary wheels 14 and 18 and of course it is evident that this percentage may be made in accordance with the proportion of the total weight of the locomotive carried by the auxiliary wheels. Most engines have power more than sufficient to slip the main drive wheels 7 and consequently an arrangement such as that illustrated is adapted to fully utilize the full capacity of the locomotive and to produce a maximum tractive effort for a given overall weight.

It is evident that connections may be provided whereby all or a part of the current generated by the generators 12 may be delivered to motors adapted to drive the wheels of some of the cars connected to the locomotive, and that, if desired, suitable clutches may be provided whereby the generators and motors may be disconnected from the running gear of the locomotive.

While I have described and illustrated but one embodiment of my invention, it will be apparent to those skilled in the art, that various changes, modifications, additions and omissions may be made in the apparatus described and illustrated, without departing from the spirit and scope of the invention, as set forth in the appended claims.

What I claim is:

1. In combinaton with a locomotive, drive wheels, means for delivering power therto, auxiliary wheels, means for converting a part of the energy delivered to the drive wheels into electrical energy, and menas employing said electrical energy in delivering power to the auxiliary wheels.

2. A locomotive having steam driven wheels, electrical generators operatively connected thereto, auxiliary wheels, motors operatively connected to the auxiliary wheels, and means for delivering the current generated by the generator to the motors.

3. In combination with a locomotive, drive wheels, means for delivering power thereto, a generator operatively connected to the drive wheels, auxiliary wheels, a motor operatively connected thereto, means for electrically connecting the generator and the motor, and separate means for delivering current to the generator.

4. In combination with a locomotive, drive wheels, means for delivering power thereto, a generator operatively connected to the drive wheels, auxiliary wheels, a motor operatively connected thereto, means for electrically connecting the generator and the motor, and separate means for delivering current to the motor.

5. In combination with a locomotive, drive wheels, means for delivering power thereto, a generator operatively connected to the drive wheels, auxiliary wheels, a motor operatively connected thereto, means for electrically connecting the generator and the motor, and separate means for delivering current to the generator and the motor.

6. In a locomotive, an engine, drive wheels carrying at least a part of the weight of the engine, means for delivering power to the drive wheels, a tender, wheels carrying at least a part of the weight of the tender, means for delivering a part of the power delivered to the drive wheels into electrical energy, and means employing said electrical energy in delivering power to the last mentioned wheels.

7. In combination with the steam driven drive wheels of a locomotive, a generator driven by said wheels, auxiliary wheels, a motor for driving said wheels electrically connected to said generator, and a separately driven generator for supplying current to both the fields and armature of said generator and motor.

8. In combination with the steam driven drive wheels of a locomotive, a generator driven by said wheels, auxiliary wheels, a motor for driving said wheels electrically connected to said generator, a reversing switch included in said connections, and a reversing lever for the locomotive operatively connected to said switch, and a separately driven generator for supplying current to both the fields and armature of said generator and motor.

9. In combination with the steam driven drive wheels of a locomotive, a generator driven by said wheels, auxiliary wheels, a motor for driving said wheels electrically connected to said generator, a reversing and interrupting switch included in said connections, and a reversing lever on the locomotive operatively connected thereto, whereby the motor and generator are rendered inoperative at low cutoffs.

10. In combination with the steam driven drive wheels of a locomotive, a generator driven by said wheels, auxiliary wheels, a motor for driving said wheels, electrically connected to said generator, a throttle valve for controlling the delivery of steam to the engine cylinder, an interrupting switch included in said connections and operatively connected to the operating mechanism of said valve.

In testimony whereof, I have hereunto subscribed my name this 2d day of June, 1919.

ALEXANDER T. KASLEY.

Witness:
JAMES GOSO.